United States Patent
Xu et al.

(10) Patent No.: US 11,792,892 B2
(45) Date of Patent: *Oct. 17, 2023

(54) METHOD AND DEVICE FOR MANAGING INTERFACE FOR SUPPORTING LTE/NR INTERWORKING IN WIRELESS COMMUNICATION SYSTEM

(71) Applicant: LG Electronics Inc., Seoul (KR)

(72) Inventors: Jian Xu, Seoul (KR); Daewook Byun, Seoul (KR); Seokjung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/512,228

(22) Filed: Oct. 27, 2021

(65) Prior Publication Data

US 2022/0053608 A1 Feb. 17, 2022

Related U.S. Application Data

(63) Continuation of application No. 16/476,022, filed as application No. PCT/KR2018/000164 on Jan. 4, 2018, now Pat. No. 11,219,095.

(Continued)

(51) Int. Cl.
*H04W 92/20* (2009.01)
*H04W 76/15* (2018.01)
(Continued)

(52) U.S. Cl.
CPC ............ *H04W 92/20* (2013.01); *H04W 76/11* (2018.02); *H04W 76/14* (2018.02); *H04W 76/15* (2018.02)

(58) Field of Classification Search
CPC ..... H04W 92/20; H04W 76/15; H04W 76/14; H04W 76/11; H04W 88/06; H04W 76/16;
(Continued)

(56) References Cited

U.S. PATENT DOCUMENTS

2013/0142161 A1 6/2013 Lee et al.
2015/0373759 A1 12/2015 Wang et al.
(Continued)

FOREIGN PATENT DOCUMENTS

CN 104584463 4/2015
EP 2249615 11/2010
(Continued)

OTHER PUBLICATIONS

3rd Generation Partnership Project; Technical Specification Group Radio Access Network, "Evolved Universal Terrestrial Radio Access Network (E-UTRAN); X2 application protocol (X2AP) (Release 14)," 3GPP TS 36.423, Sep. 2016, 96 pages.

(Continued)

*Primary Examiner* — Pao Sinkantarakorn
*Assistant Examiner* — Kabir U Jahangir
(74) *Attorney, Agent, or Firm* — Fish & Richardson P.C

(57) ABSTRACT

Provided is a method for supporting E-UTRAN-NR dual connectivity (EN-DC) indicating dual connectivity between Long-Term Evolution (LTE), that is, Evolved UMTS Terrestrial Radio Access Network (E-UTRAN), and New Radio (NR) Access Technology (NR) in a wireless communication system. A first radio access network (RAN) node transmits an X2 configuration request message, including a first indication indicating that the first RAN node supports EN-DC, to a second RAN node, and receives an X2 configuration response message, including a second indication indicating that the second RAN node supports the EN-DC, from the second RAN node.

20 Claims, 12 Drawing Sheets

Related U.S. Application Data

(60) Provisional application No. 62/443,003, filed on Jan. 6, 2017.

(51) Int. Cl.
*H04W 76/14* (2018.01)
*H04W 76/11* (2018.01)

(58) Field of Classification Search
CPC .. H04W 36/0069; H04W 24/02; H04W 92/02
See application file for complete search history.

(56) References Cited

U.S. PATENT DOCUMENTS

| | | | |
|---|---|---|---|
| 2016/0212775 A1 | 7/2016 | Xu et al. | |
| 2018/0302827 A1 | 10/2018 | Mitsui et al. | |
| 2019/0349906 A1 | 11/2019 | Futaki et al. | |
| 2019/0380172 A1 | 12/2019 | Xu et al. | |

FOREIGN PATENT DOCUMENTS

| | | |
|---|---|---|
| EP | 3547793 | 10/2019 |
| JP | 2015185938 | 10/2015 |
| JP | 2020504544 | 2/2020 |
| WO | WO2015046911 | 4/2015 |
| WO | WO2016114612 | 7/2016 |
| WO | WO2016190357 | 12/2016 |
| WO | WO2018128406 | 7/2018 |

OTHER PUBLICATIONS

Catt, "Interworking between LTE and 5G NR," R2-162566, 3GPP TSG RAN WG2 Meeting #93bis, Dubrovnik, Croatia, dated Apr. 2, 2016, 6 pages.
CN Office Action in Chinese Appln. No. 201880005927.0, dated Sep. 1, 2021, 17 pages (with English Abstract).
Ericsson, "Overview of RRC architecture options for the L TE-NR tight interworking," R2-164005, 3GPP TSG-RAN WG2 #94, Nanjing, P.R. China, dated May 23-27, 2016, 6 pages.
Ericsson, "Response to R3-162741," R3-163074, 3GPP TSG-RAN WG3 Meeting #94, Reno, NV, U.S., Nov. 14-18, 2016, 4 pages.
Extended European Search Report in European Application No. 18736761.0, dated Nov. 18, 2019, 12 pages.
Huawei, "Xx interface justification and functionalities," R3-162356, 3GPP TSG-RAN WG3 Meeting #93bis, 3GPP TSG-RAN WG3 Meeting #93bis, dated Oct. 10-14, 2016, 5 pages.
Japanese Office Action in Japanese Application No. 2019-536912, dated Aug. 11, 2020, 5 pages (with English translation).
Japanese Office Action in Japanese Appln. No. 2019-536912, dated Dec. 8, 2020, 7 pages (with English translation).
Nec, "Tight interworking between NR and LTE," R2-162889, 3GPP TSG RAN2#93bis, Dubrovnik, Croatia, dated Apr. 2, 2016, 7 pages.
Nokia, Alcatel-Lucent Shanghai Bell, "On UE capability and network node coordination aspects in LTENR tight interworking," R2-166243, 3GPP TSG-RAN WG2 Meeting #95bis, Kaohsiung, Taiwan, dated Sep. 3, 2016, 11 pages.
Qualcomm Incorporated (Rapporteur), "Report of e-mail discussion [95#30] Capability coordination for NR and LTE," R2-167065, 3GPP TSG-RAN WG2 Meeting #95bis, Kaohsiung, Taiwan, dated Oct. 1, 2016, 43 pages.

METHOD AND DEVICE FOR MANAGING INTERFACE FOR SUPPORTING LTE/NR INTERWORKING IN WIRELESS COMMUNICATION SYSTEM

CROSS-REFERENCE TO RELATED APPLICATIONS

This application is a continuation of Ser. No. 16/476,022, filed on Jul. 3, 2019, which is a National Stage application under 35 U.S.C. § 371 of International Application No. PCT/KR2018/000164, filed on Jan. 4, 2018, which claims the benefit of U.S. Provisional Application No. 62/443,003, filed on Jan. 6, 2017. The disclosures of the prior applications are incorporated by reference in their entirety.

BACKGROUND OF THE INVENTION

Field of the Invention

The present invention relates to wireless communication and, more particularly, to a method and device for managing an interface for supporting interworking of 3rd generation partnership project (3GPP) long-term evolution (LTE) and new radio access technology (NR) among wireless communication systems.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. The NR system may be called another name, e.g. new radio access technology (new RAT). 3GPP has to identify and develop the technology components needed for successfully standardizing the NR timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

New architecture for a 5G core network including NR and 5G radio access network (RAN) may provide better services for user equipment (UE) in terms of throughput and UE experience. Also, tight interworking of LTE/NR is under discussion. dual/multiple connectivity capable of improving throughput of a UE according to the tight interworking of LTE/NR may be used, and signaling for UE mobility may be simplified.

A method for more efficiently supporting tight interworking of LTE/NR may be required.

SUMMARY OF THE INVENTION

The present invention provides a method and device for managing an interface to support interworking of the 3GPP LTE and NR among wireless communication systems. The present invention provides an improved cell-specific procedure for dual/multiple connectivity in the 5G radio access network (RAN).

In an aspect, a method for performing an X2 setup procedure by a first radio access network (RAN) node in a wireless communication system is provided. The method includes transmitting an X2 setup request message including a first indication indicating that the first RAN node supports a evolved-UMTS terrestrial radio access (E-UTRAN)-new radio access network (NR) dual connectivity (EN-DC) to a second RAN node, and receiving an X2 setup response message including a second indication indicating that the second RAN node supports the EN-DC from the second RAN node.

In another aspect, a first radio access network (RAN) node in a wireless communication system is provided. The first RAN node includes a memory, and a processor, operably coupled to the memory. The processor transmits an X2 setup request message including a first indication indicating that the first RAN node supports a evolved-UMTS terrestrial radio access (E-UTRAN)-new radio access network (NR) dual connectivity (EN-DC) to a second RAN node, and receives an X2 setup response message including a second indication indicating that the second RAN node supports the EN-DC from the second RAN node.

The first RAN node may be an eNodeB (eNB), and the second RAN node may be a gNB. The first indication may correspond to a global eNB identifier (ID), and the second indication may correspond to a global gNB ID.

Alternatively, the first RAN node may be gNB, and the second RAN node may be an eNB. The first indication may correspond to a global gNB ID, and the second indication may correspond to a global eNB ID.

The X2 setup request message may be an EN-DC X2 setup request message, and the X2 setup response message may be an EN-DC X2 setup response message.

The first RAN node may trigger a dual connectivity procedure related to the EN-DC, based on the second indication.

Tight interworking of LTE/NR may be supported more efficiently.

DESCRIPTION OF EXEMPLARY EMBODIMENTS

Hereinafter, in the present invention, a wireless communication system based on a 3rd generation partnership project (3GPP) or institute of electrical and electronics engineers (IEEE) is mainly described. However, the present invention is not limited thereto, and the present invention may be applied to other wireless communication systems having the same characteristics to be described hereinafter.

Figure 1:
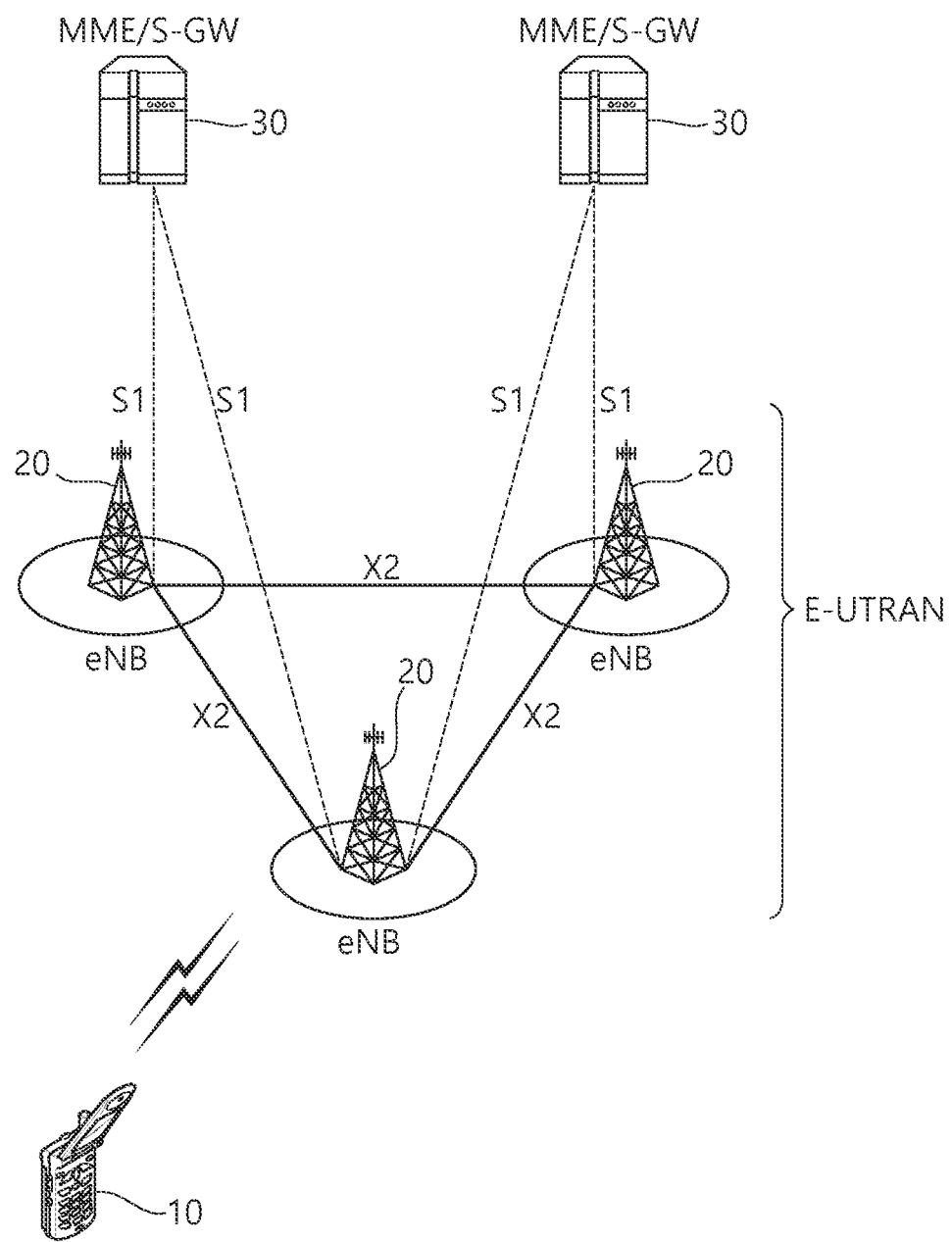
FIG. 1 shows 3GPP LTE system architecture.

FIG. 1 shows 3GPP LTE system architecture. Referring to FIG. 1, the 3GPP LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g. deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

5G system is a 3GPP system consisting of 5G access network (AN), 5G core network (CN) and UE. 5G access network is an access network comprising a next generation radio access network (NG-RAN) and/or non-3GPP access network connecting to a 5G core network. NG-RAN is a radio access network that supports one or more of the following options with the common characteristics that it connects to 5G core network:

1) Standalone new radio (NR).
2) NR is the anchor with E-UTRA extensions.
3) Standalone E-UTRA.
4) E-UTRA is the anchor with NR extensions.

Figure 2:
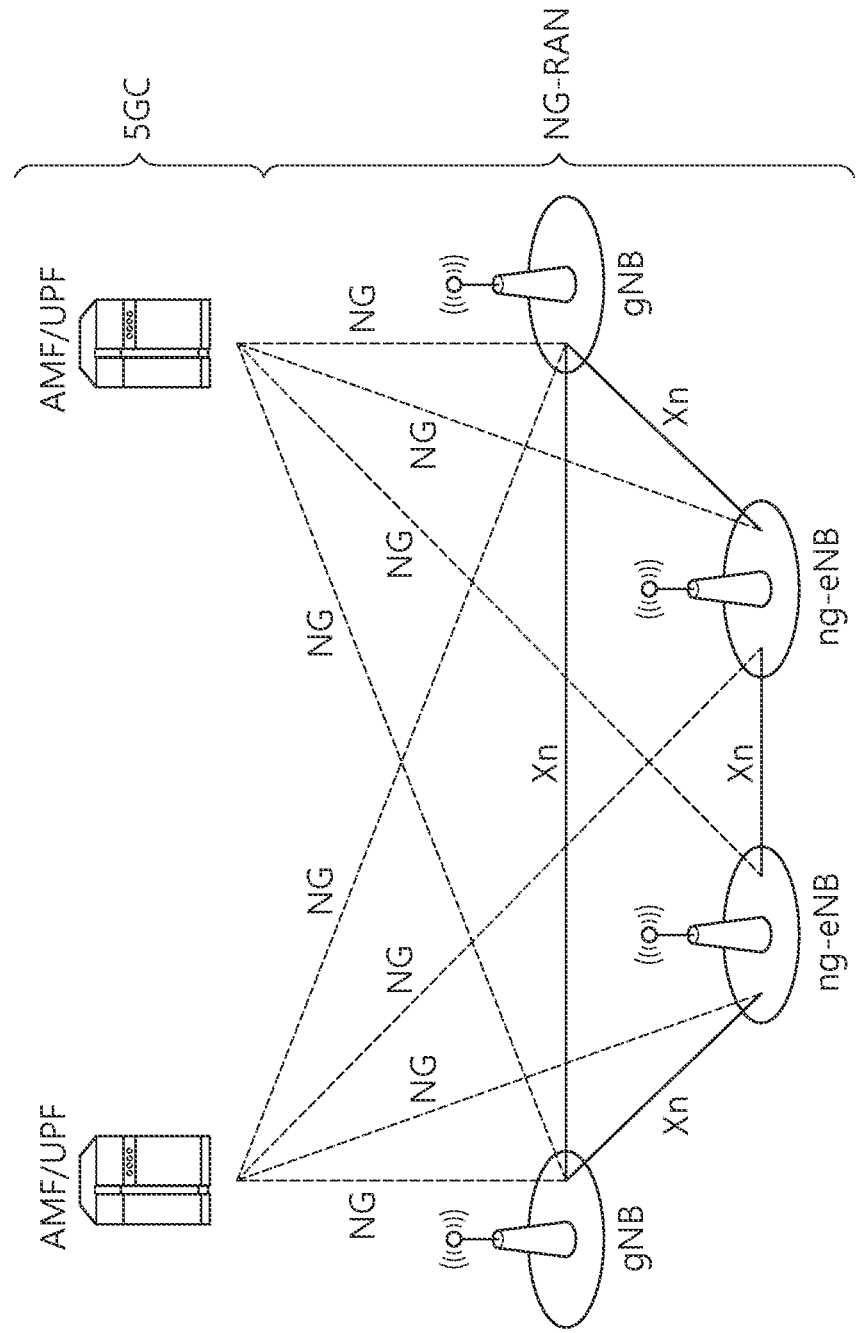
FIG. 2 shows an NG-RAN architecture.

FIG. 2 shows an NG-RAN architecture. Referring to FIG. 2, the NG-RAN includes at least one NG-RAN node. The NG-RAN node includes at least one gNB and/or at least one ng-eNB. The gNB provides NR user plane and control plane protocol terminations towards the UE. The ng-eNB provides E-UTRA user plane and control plane protocol terminations towards the UE. The gNBs and ng-eNBs are interconnected with each other by means of the Xn interface. The gNBs and ng-eNBs are also connected by means of the NG interfaces to the 5G CN. More specifically, the gNBs and ng-eNBs are connected to the access and mobility management function (AMF) by means of the NG-C interface and to the user plane function (UPF) by means of the NG-U interface.

The gNB and ng-eNB host the following functions:

Functions for radio resource management: Radio bearer control, radio admission control, connection mobility control, dynamic allocation of resources to UEs in both uplink and downlink (scheduling);

Internet protocol (IP) header compression, encryption and integrity protection of data;

Selection of an AMF at UE attachment when no routing to an AMF can be determined from the information provided by the UE;

Routing of user plane data towards UPF(s);

Routing of control plane information towards AMF;

Connection setup and release;

Scheduling and transmission of paging messages;

Scheduling and transmission of system broadcast information (originated from the AMF or operations & maintenance (O&M));

Measurement and measurement reporting configuration for mobility and scheduling;

Transport level packet marking in the uplink;

Session management;

Support of network slicing;

QoS flow management and mapping to data radio bearers;

Support of UEs in RRC_INACTIVE state;

Distribution function for non-assess stratum (NAS) messages;

Radio access network sharing;
Dual connectivity;
Tight interworking between NR and E-UTRA.
The AMF hosts the following main functions:
NAS signaling termination;
NAS signaling security;
AS security control;
Inter CN node signaling for mobility between 3GPP access networks;
Idle mode UE reachability (including control and execution of paging retransmission);
Registration area management;
Support of intra-system and inter-system mobility;
Access authentication;
Access authorization including check of roaming rights;
Mobility management control (subscription and policies);
Support of network slicing;
Session management function (SMF) selection.
The UPF hosts the following main functions:
Anchor point for Intra-/Inter-radio access technology (RAT) mobility (when applicable);
External protocol data unit (PDU) session point of interconnect to data network;
Packet routing & forwarding;
Packet inspection and user plane part of policy rule enforcement;
Traffic usage reporting;
Uplink classifier to support routing traffic flows to a data network;
Branching point to support multi-homed PDU session;
QoS handling for user plane, e.g. packet filtering, gating, UL/DL rate enforcement;
Uplink traffic verification (service data flow (SDF) to QoS flow mapping);
Downlink packet buffering and downlink data notification triggering.
The SMF hosts the following main functions:
Session management;
UE IP address allocation and management;
Selection and control of UP function;
Configures traffic steering at UPF to route traffic to proper destination;
Control part of policy enforcement and QoS;
Downlink data notification.

In what follows, multi-RAT dual connectivity will be described. NG-RAN supports multi-RAT dual connectivity configured so that a UE in the RRC_CONNECTED state with multiple RX/TX may use radio resources provided by two separate schedulers. Multi-RAT dual connectivity is generalization of the E-UTRA dual connectivity. Two separate schedulers are located at two different NG-RAN nodes connected to each other through a non-ideal backhaul. One of the two different NG-RAN nodes performs the role of a master node (MN), and the other one performs the role of a secondary node (SN). In other words, one scheduler is located at the MN while the other scheduler is located at the SN. The two different NG-RAN nodes provide either the E-UTRA connectivity (when the NG-RAN node is an ng-eNB) or NR connectivity (when the NG-RAN node is a gNB). The ng-eNB is a node that provides the NR user plane and control plane protocol termination toward a UE and operates as an SN in the E-UTRAN-NR dual connectivity (EN-DC). The gNB is a node that provides the E-UTRA user plane and control plane protocol termination toward a UE and is connected to 5G CN through an NG interface. The MN and SN are connected to each other through a network interface, and at least the MN is connected to the core network. Although multi-RAT dual connectivity in the present specification has been designed based on a non-ideal backhaul between different nodes, the multi-RAT dual connectivity may also be used for an ideal backhaul.

Figure 3:
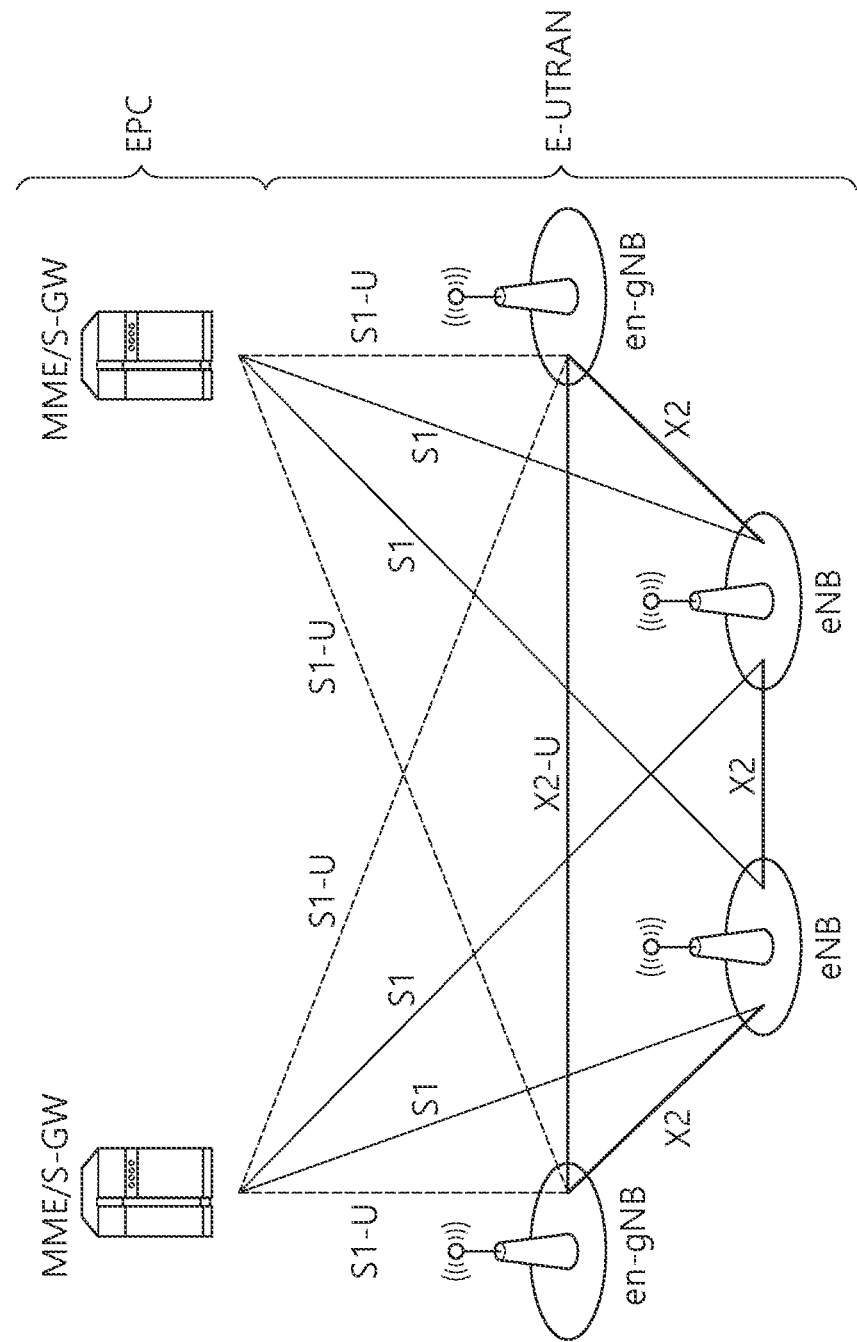
FIG. 3 illustrates EN-DC architecture.

FIG. 3 illustrates EN-DC architecture. The E-UTRAN supports multi-RAT dual connectivity through EN-DC, where a UE is connected to one eNB operating as an MN and one en-gNB operating as an SN. An eNB is connected to EPC through S1 interface and connected to en-gNB through X2 interface. The en-gNB may be connected to the EPC through S1-U interface and connected to a different en-gNB through X2-U interface.

The 5G CN also supports multi-RAT dual connectivity. An NG-RAN supports NG-RAN E-UTRA-NR dual connectivity (NGEN-DC), where a UE is connected to one ng-eNB operating as an MN and one gNB operating as an SN. The ng-eNB is connected to the 5G CN, and the gNB is connected to the ng-eNB through Xn interface. Also, the NG-RAN supports NR-E-UTRA dual connectivity (NE-DC), where a UE is connected to one gNB operating as an MN and one ng-eNB operating as an SN. The gNB is connected to the 5G CN, and ng-eNB is connected to the gNB through Xn interface.

To support the aforementioned multi-RAT dual connectivity and/or tight interworking of LTE/NR, various disposition scenarios for LTE and NR may be considered.

Figure 4:
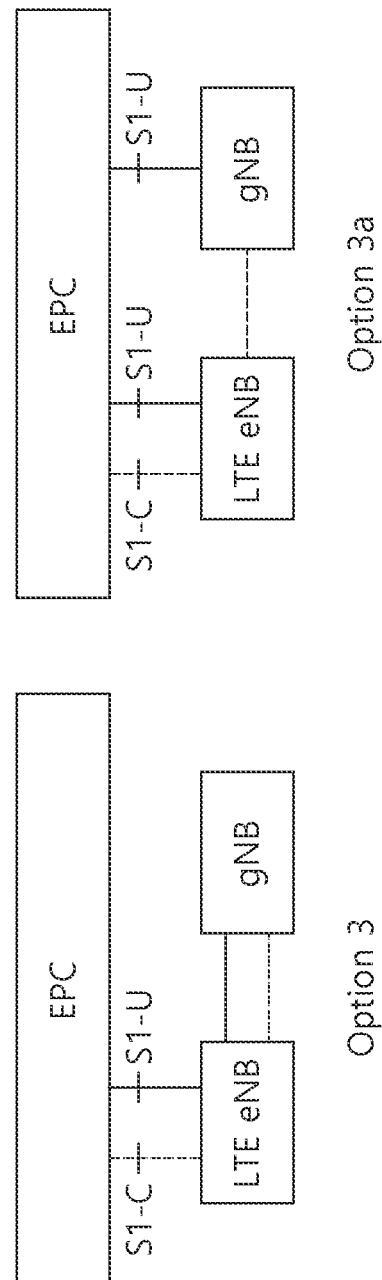
FIG. 4 illustrates the option 3/3a of the disposition scenario for tight interworking of LTE/NR.

FIG. 4 illustrates the option 3/3a of the disposition scenario for tight interworking of LTE/NR. Referring to FIG. 4, in the case of option 3/3a, LTE eNB is connected to the EPC together with a non-standalone NR. In other words, the NR control plane is not directly connected to the EPC but connected through the LTE eNB. The NR user plane is connected to the EPC through the LTE eNB (option 3) or connected directly through the S-1U interface (option 3a). Option 3/3a corresponds to the EN-DC architecture of FIG. 3.

Figure 5:
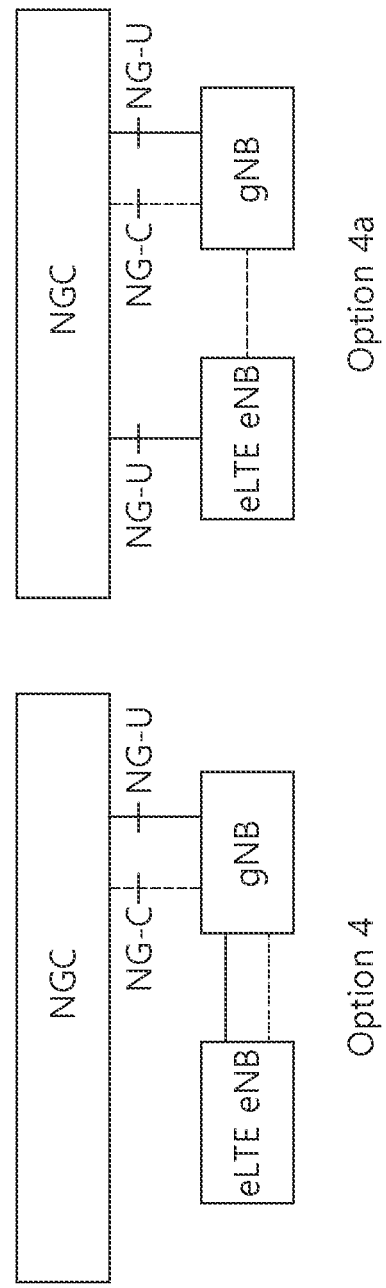
FIG. 5 illustrates the option 4/4a of the disposition scenario for tight interworking of LTE/NR.

FIG. 5 illustrates the option 4/4a of the disposition scenario for tight interworking of LTE/NR. Referring to FIG. 5, in the case of option 4/4a, eNB is connected to the NGC together with a non-standalone E-UTRA. In other words, the E-UTRA control plane is not directly connected to the NGC but connected through the gNB. The E-UTRA control plane is connected to the NGC through the gNB (option 4) or connected directly through the NG-U interface (option 4a). Option 4/4a corresponds to the option 3/3a with the E-UTRA and NR exchanged.

Figure 6:
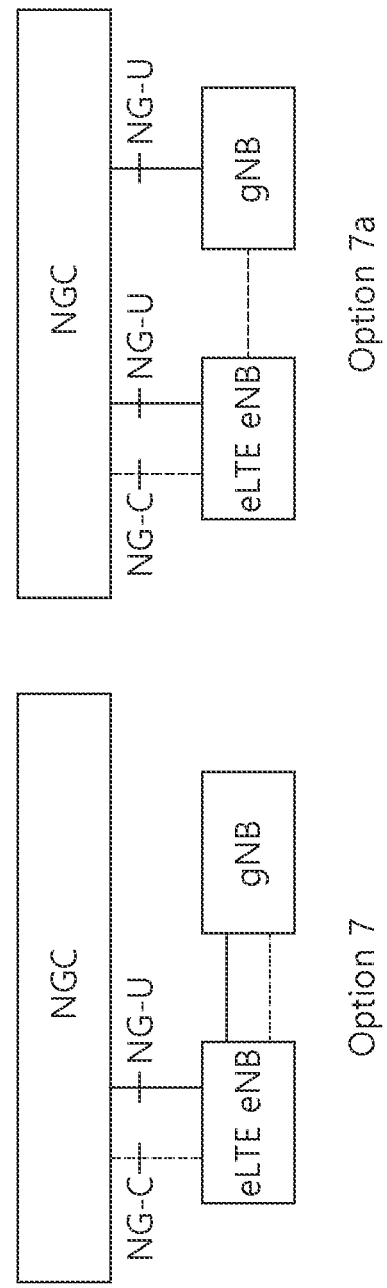
FIG. 6 illustrates the option 7/7a of the disposition scenario for tight interworking of LTE/NR.

FIG. 6 illustrates the option 7/7a of the disposition scenario for tight interworking of LTE/NR. Referring to FIG. 6, in the case of option 7/7a, eLTE eNB (namely, ng-eNB) is connected to the NGC together with a non-standalone NR. In other words, the NR control plane is not directly connected to the NGC but connected through the eLTE eNB. The NR user plane is connected to the NGC through the eLTE eNB (option 7) or connected directly through the NG-U interface (option 7a).

A method for supporting multi-RAT dual connectivity according to the aforementioned various disposition scenarios is under discussion. As described above, it may be seen that there may be various options to choose two nodes (for example, eNB, gNB, ng-eNB, en-gNB) performing the multi-RAT dual connectivity operation. Therefore, which option to use among the various disposition scenario options still needs to be determined.

More specifically, in the legacy LTE-based system, evolved packet system (EPS) bearer/E-UTRAN radio access bearer (E-RAB) and quality of service (QoS) are used, which corresponds to the option 3/3a for the case of data packets. This is so because in the case of option 3/3a, EPS is the core network. However, in the case of option 4/4a and 7/7a, new features such as a newly introduced flow concept, flow-QoS mapping rule, RRC signaling, and UE capability negotiation among nodes may be adopted. This is so because NGC is the core network for the options 4/4a and 7/7a. Therefore, it may be conjectured that a procedure for triggering an offloading procedure (namely multi-RAT dual connectivity) is different from a dual connectivity procedure of the legacy LTE. In other words, depending on the various disposition scenario options for multi-RAT dual connectivity, it may not be easy for an RAN node to determine a method for triggering a dual connectivity procedure. The present invention proposes a method for solving the aforementioned problem.

1. First Embodiment

Figure 7:
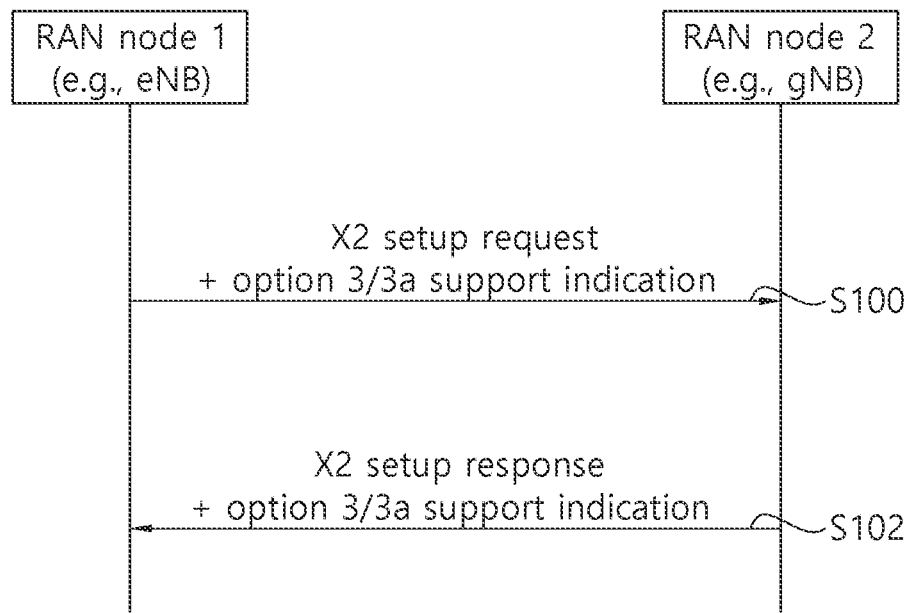
FIG. 7 illustrates a procedure for setting up an RAN interface according to one embodiment of the present invention.

FIG. 7 illustrates a procedure for setting up an RAN interface according to one embodiment of the present invention. In the present embodiment, it is assumed that RAN node 1 is eNB, and RAN node 2 is gNB. However, the assumption is only an example, and RAN node 1 and RAN node 2 may be one of eNB, gNB, ng-eNB, and en-gNB. Also, in the present embodiment, it is assumed that the RAN interface of the RAN node 1 and RAN node 2 is X2 interface. However, this assumption is also an example, and various other names may be used to refer to the RAN interface of the RAN node 1 and RAN node 2 (for example, Xn interface). In the present embodiment, the RAN node 1 triggers a procedure for setting up the RAN interface.

When the RAN interface between the RAN node 1 and RAN node 2 is setup, if the RAN node 1 supports the option 3/3a architecture for LTE/NR interworking, the RAN node 1 may want to know whether a target node also supports the option 3/3a architecture for LTE/NR interworking. This is so because depending on whether a target node supports the option 3/3a architecture for LTE/NR interworking, different messages may be used for triggering a dual connectivity procedure.

Accordingly, in step S100, the RAN node 1 transmits an RAN interface setup request message to the RAN node 2. The RAN interface setup request message may include an indication indicating that the RAN node 1 supports the option 3/3a. Also, the RAN interface setup request message may include an indication requesting reporting whether a target node (namely, RAN node 2) of the RAN interface setup request message supports the option 3/3a. Also, the RAN interface setup request message may include an enhanced eNB ID of the RAN node 1. The enhanced eNB ID of the RAN node 1 may be a global eNB ID of the RAN node 1. The indication indicating that the RAN node 1 supports the option 3/3a may be implemented by the enhanced eNB ID of the RAN node 1 or by the global eNB ID of the RAN node 1. In other words, the enhanced eNB ID or global eNB ID of the RAN node 1 may implicitly indicate that the RAN node 1 supports the option 3/3a. The RAN interface setup request message may be implemented by an existing message or a new message of the X2 interface or implemented by a new message of a new interface.

The RAN node 2, which has received an indication indicating that the RAN node 1 supports the option 3/3a and/or an RAN interface setup request message including the enhanced eNB ID (or global eNB ID) of the RAN node 1, may take into account, for a UE-specific procedure, the indication indicating that the RAN node 1 supports the option 3/3a and/or the enhanced eNB ID (or global eNB ID) of the RAN node 1. For example, the RAN node 2 may use the indication indicating that the RAN node 1 supports the option 3/3a and/or the enhanced eNB ID (or global eNB ID) of the RAN node 1 for a dual connectivity procedure or multiple connectivity procedure.

Also, in step S102, the RAN node 2 transmits an RAN interface setup response message to the RAN node 1. If the received RAN interface setup request message includes an indication requesting reporting whether the RAN node 2 supports the option 3/3a, the RAN interface setup response message may include an indication indicating that the RAN node 2 supports the option 3/3a. The indication indicating that the RAN node 2 supports the option 3/3a may be implemented by the global gNB ID of the RAN node 2. In other words, the global gNB ID of the RAN node 2 may implicitly indicate that the RAN node 2 supports the option 3/3a. The RAN interface setup response message may be implemented by an existing message or a new message of the X2 interface or implemented by a new message of a new interface.

The RAN node 1, which has received an RAN interface setup response message including an indication indicating that the RAN node 2 supports the option 3/3a and/or a global gNB ID of the RAN node 2, may perform a suitable operation based on the indication indicating that the RAN node 2 supports the option 3/3a and/or the global gNB ID of the RAN node 2. For example, based on the indication indicating that the RAN node 2 supports the option 3/3a and/or the global gNB ID of the RAN node 2, the RAN node 1 may trigger a new dual connectivity procedure distinguished from the legacy LTE dual connectivity procedure. Depending on the type of dual connectivity procedure, whether UE capability, flow-data ratio bearer (DRB) mapping rule, etc., have to be included in the SeNB addition/modification message may be determined. Also, the RAN node 1 may determine the QoS type for a PDU session during the SeNB addition/modification procedure differently according to the type of the dual connectivity procedure. Meanwhile, the RAN interface setup response message received at step S102 may include an existing eNB ID, which may be ignored by the RAN node 1.

Figure 8:
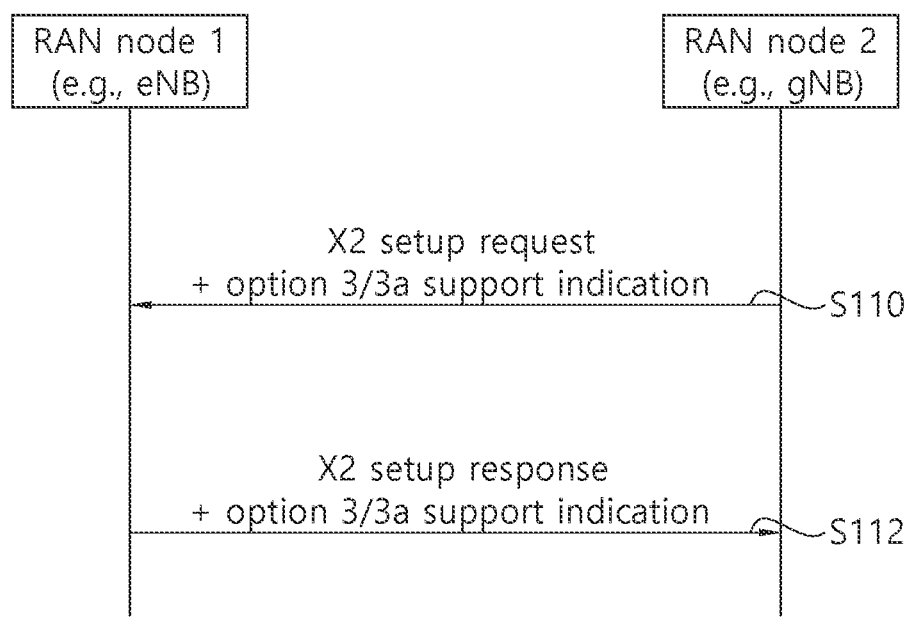
FIG. 8 illustrates an RAN interface setup procedure according to another embodiment of the present invention.

FIG. 8 illustrates an RAN interface setup procedure according to another embodiment of the present invention. In the present embodiment, it is assumed that RAN node 1 is eNB, and RAN node 2 is gNB. However, the assumption is only an example, and the RAN node 1 and RAN node 2 may be any one of eNB, gNB, ng-eNB, and en-gNB. Also, the present embodiment assumes that the RAN interface of the RAN node 1 and RAN node 2 is X2 interface. However, the assumption is also a mere example, and the RAN interface between the RAN node 1 and RAN node 2 may be called by various other names (for example, Xn interface). In the present embodiment, the RAN node 2 triggers the RAN interface setup procedure.

When the RAN interface is setup between the RAN node 1 and RAN node 2, if the RAN node 2 supports the architecture of option 3/3a for LTE/NR interworking, the RAN node 2 may want to know whether a target node also supports the architecture of option 3/3a for LTE/NR interworking. This is so because a different message may be used for the dual connectivity procedure depending on whether the target node supports the architecture of option 3/3a for LTE/NR interworking.

Accordingly, in step S110, the RAN node 2 transmits an RAN interface setup request message to the RAN node 1. The RAN interface setup request message may include an indication indicating that the RAN node 2 supports the option 3/3a. Also, the RAN interface setup request message may include an indication requesting reporting whether a target node (namely RAN node 1) of the RAN interface setup request message supports the option 3/3a. Also, the RAN interface setup request message may include a global gNB ID of the RAN node 2. The indication indicating that the RAN node 2 supports the option 3/3a may be implemented by the global gNB ID of the RAN node 2. In other words, the global gNB ID of the RAN node 2 may implicitly indicate that the RAN node 2 supports the option 3/3a. The RAN interface setup request message may be implemented by an existing message or a new message of the X2 interface or implemented by a new message of a new interface.

The RAN node 1, which has received an RAN interface setup request message including an indication indicating that the RAN node 2 supports the option 3/3a and/or a global gNB ID of the RAN node 2, may take into account the indication indicating that the RAN node 2 supports the option 3/3a and/or the global gNB ID of the RAN node 2 for a UE-specific procedure. For example, the RAN node 1 may use an indication indicating that the RAN node 2 supports the option 3/3a and/or the global gNB ID of the RAN node 2 for a dual connectivity procedure or multiple connectivity procedure.

Also, in step S112, the RAN node 1 transmits an RAN interface setup response message to the RAN node 2. If the received RAN interface setup request message includes an indication requesting reporting whether the RAN node 1 supports the option 3/3a, the RAN interface setup response message may include an indication indicating that the RAN node 1 supports the option 3/3a. The indication indicating that the RAN node 1 supports the option 3/3a may be implemented by the enhanced eNB ID of the RAN node 1. The enhanced eNB ID of the RAN node 1 may be the global eNB ID of the RAN node 1. In other words, the enhanced eNB ID (or global eNB ID) of the RAN node 1 may implicitly indicate that the RAN node 1 supports the option 3/3a. The RAN interface setup response message may be implemented by an existing message or a new message of the X2 interface or implemented by a new message of a new interface.

The RAN node 2, which has received an RAN interface setup response message including an indication indicating that the RAN node 1 supports the option 3/3a and/or an enhanced eNB ID (or global eNB ID) of the RAN node 1, may perform a suitable operation based on the indication indicating that the RAN node 1 supports the option 3/3a and/or the enhanced eNB ID (or global eNB ID) of the RAN node 1. For example, based on the indication indicating that the RAN node 1 supports the option 3/3a and/or the enhanced eNB ID (or global eNB ID) of the RAN node 1, the RAN node 2 may trigger a new dual connectivity procedure distinguished from the legacy LTE dual connectivity procedure. Depending on the type of dual connectivity procedure, whether UE capability, flow-DRB mapping rule, etc., have to be included in the SeNB addition/modification message may be determined. Also, the RAN node 2 may determine the QoS type for a PDU session during the SeNB addition/modification procedure differently according to the type of the dual connectivity procedure. Meanwhile, the RAN interface setup response message received at step S112 may include an existing eNB ID, which may be ignored by the RAN node 2.

The RAN interface setup procedure described with reference to FIG. 7 or 8 may be the EN-DC X2 setup procedure. The purpose of the EN-DC X2 setup procedure is to exchanged application level configuration data required for an eNB and en-gNB to properly inter-operate on the X2 interface. The EN-DC X2 setup procedure deletes existing application level configuration data of two nodes and substitute received data for the deleted data. The EN-DC X2 setup procedure reconfigures the X2 interface as in the reconfiguration procedure. The EN-DC X2 setup procedure uses non-UE-specific signaling.

If the RAN interface setup procedure described with reference to FIG. 7 or 8 is the EN-DC X2 setup procedure, the RAN interface setup request message transmitted by the RAN node 1 of FIG. 7 and the RAN interface setup request message transmitted by the RAN node 2 of FIG. 8 may be the EN-DC X2 setup request message described in the Table 1 below. The EN-DC X2 setup request message is a message transmitted to a neighboring E-UTRAN node by an initiating E-UTRAN node, and both of the two nodes may interact with each other for the EN-DC. The EN-DC X2 setup request message delivers initialization information about transport network layer (TNL) association.

TABLE 1

| IE/Group Name | Presence | Range | IE type and reference | Semantics description | Criticality | Assigned Criticality |
|---|---|---|---|---|---|---|
| Message Type | M | | 9.2.13 | | YES | reject |
| CHOICE Initiating NodeType | M | | | | | |
| >eNB | | | | | | |
| >>Global eNB ID | M | | 9.2.22 | | YES | reject |
| >en-gNB | | | | | | |
| >>Global en-gNB ID | M | | <ref> | | YES | reject |
| >>List of Served NR Cells | | 1 ... <maxCellinengNB> | | list of cells served by the engNB | YES | reject |
| >>>Served NR Cell Information | M | | 9.2.y | | — | — |
| >>>NR Neighbour Information | O | | 9.2.x | NR neighbors | YES | ignore |

Referring to Table 1, the EN-DC X2 setup request message may include a global eNB ID ("Global eNB ID" information element (IE)) or global eNB ID ("global en-gNB ID" IE) according to the entity that transmits the message. More specifically, if the eNB transmits the EN-DC X2 setup request message according to the embodiment of FIG. 7, the EN-DC X2 setup request message may include the global eNB ID. If the gNB transmits the EN-DC X2 setup request message according to the embodiment of FIG. 8, the EN-DC X2 setup request message may include the global gNB ID.

Also, the RAN interface setup response message transmitted by the RAN node 2 of FIG. 7 or the RAN interface setup response message transmitted by the RAN node 1 of FIG. 8 may be the EN-DC X2 setup response message described in the Table 2 below. The EN-DC X2 setup response message is a message transmitted to an initiating E-UTRAN node by a neighboring E-UTRAN node, and both of the two nodes may interact with each other for the EN-DC. The EN-DC X2 setup response message delivers initialization information about transport network layer (TNL) association.

TABLE 2

| IE/Group Name | Presence | Range | IE type and reference | Semantics description | Criticality | Assigned Criticality |
|---|---|---|---|---|---|---|
| Message Type | M | | 9.2.13 | | YES | reject |
| CHOICE Responding NodeType | M | | | | | |
| >eNB | | | | | | |
| >>Global eNB ID | M | | 9.2.22 | | YES | reject |
| >en-gNB | | | | | | |
| >>Global en-gNB ID | M | | <ref> | | YES | reject |
| >>List of Served NR Cells | | 1 . . . <maxCellinen gNB> | | List of cells served by the en-gNB | YES | reject |
| >>>Served NR Cell Information | M | | 9.2.y | | — | — |
| >>>NR Neighbour Information | O | | 9.2.x | NR neighbors | YES | ignore |

Referring to Table 2, the EN-DC X2 setup response message may include a global eNB ID ("Global eNB ID" information element (IE)) or global eNB ID ("global en-gNB ID" IE) according to the entity that transmits the message. More specifically, if the gNB transmits the EN-DC X2 setup response message according to the embodiment of FIG. 7, the EN-DC X2 setup response message may include the global gNB ID. If the eNB transmits the EN-DC X2 setup response message according to the embodiment of FIG. 8, the EN-DC X2 setup response message may include the global eNB ID.

Figure 9:
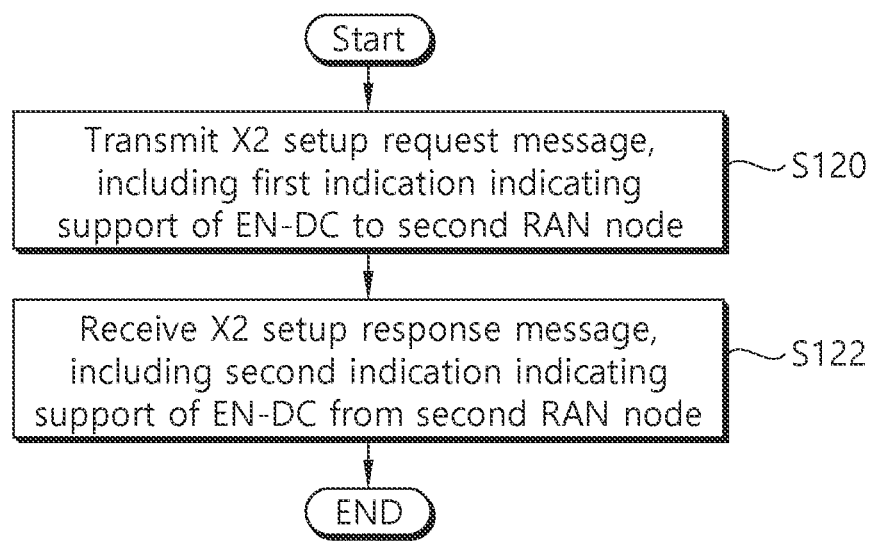
FIG. 9 shows a method for performing an X2 setup procedure by a first RAN node according to an embodiment of the present invention.

FIG. 9 shows a method for performing an X2 setup procedure by a first RAN node according to an embodiment of the present invention. The present invention described in FIGS. 7 and 8 may be applied to this embodiment.

In step S120, the first RAN node transmits an X2 setup request message including a first indication indicating that the first RAN node supports an EN-DC to a second RAN node. The X2 setup request message may be an EN-DC X2 setup request message. The EN-DC X2 setup request message may follow Table 1 described above. In step S122, the first RAN node receives an X2 setup response message including a second indication indicating that the second RAN node supports the EN-DC from the second RAN node. The X2 setup response message may be an EN-DC X2 setup response message. The EN-DC X2 setup response message may follow Table 2 described above. The first RAN node may trigger a dual connectivity procedure related to the EN-DC, based on the second indication.

The first RAN node may be an eNB, and the second RAN node may be a gNB. In this case, the first indication may correspond to a global eNB ID, and the second indication may correspond to a global gNB ID.

Alternatively, the first RAN node may be gNB, and the second RAN node may be an eNB. In this case, the first indication may correspond to a global gNB ID, and the second indication may correspond to a global eNB ID.

According to an embodiment of the present invention, new architecture for a 5G core network including NR and 5G RAN may provide better services for UE in terms of throughput and UE experience. Also, tight interworking of LTE/NR may be performed more easily according to dual/multiple connectivity that may be triggered by the MN together with a suitable procedure. Also, dual/multiple connectivity capable of improving throughput of a UE according to the tight interworking of LTE/NR may be used, and signaling for UE mobility may be simplified.

2. Second Embodiment

Figure 10:
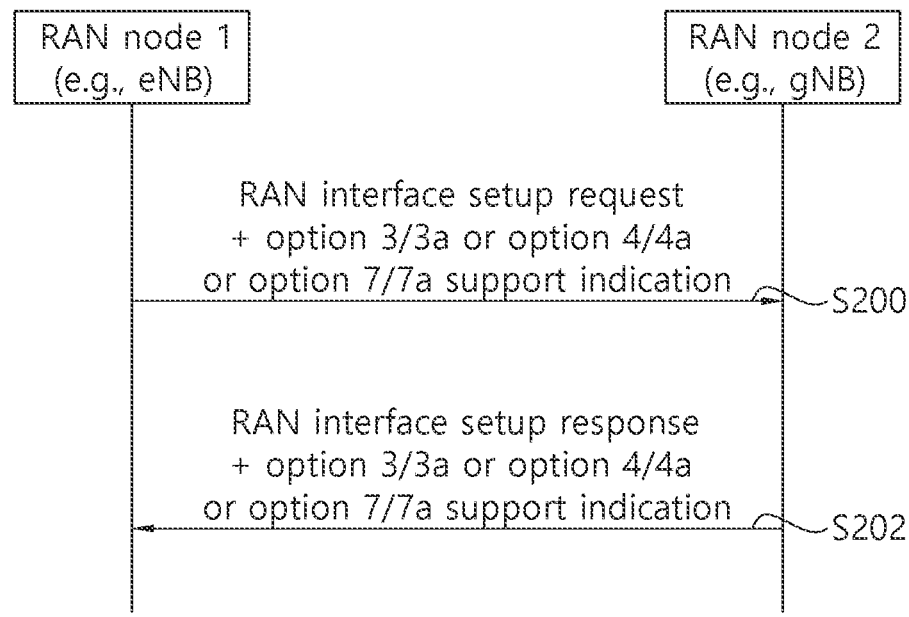
FIG. 10 illustrates an RAN interface setup procedure according to another embodiment of the present invention.

FIG. 10 illustrates an RAN interface setup procedure according to another embodiment of the present invention. In the present embodiment, it is assumed that RAN node 1 is eNB, and RAN node 2 is gNB. However, the assumption is only an example, and RAN node 1 and RAN node 2 may be one of eNB, gNB, ng-eNB, and en-gNB. Also, in the present embodiment, it is assumed that the RAN interface of the RAN node 1 and RAN node 2 is Xn interface. However, this assumption is also an example, and various other names may be used to refer to the RAN interface of the RAN node 1 and RAN node 2 (for example, Xn interface). In the present embodiment, the RAN node 1 triggers a procedure for setting up the RAN interface.

When the RAN interface between the RAN node 1 and RAN node 2 is setup, if the RAN node 1 supports the option 3/3a architecture and/or option 4/4a architecture and/or option 7/7a architecture for LTE/NR interworking, the RAN node 1 may want to know whether a target node also supports the option 3/3a architecture and/or option 4/4a architecture and/or option 7/7a architecture for LTE/NR interworking. This is so because depending on whether a target node supports the option 3/3a architecture and/or option 4/4a architecture and/or option 7/7a architecture for LTE/NR interworking, different messages may be used for triggering a dual connectivity procedure.

Accordingly, in step S200, the RAN node 1 transmits an RAN interface setup request message to the RAN node 2. The RAN interface setup request message may include an indication indicating that the RAN node 1 supports the option 3/3a. Also, the RAN interface setup request message may include an indication indicating that the RAN node 1 supports the option 4/4a. Also, the RAN interface setup request message may include an indication indicating that the RAN node 1 supports the option 7/7a. Also, the RAN interface setup request message may include an indication requesting reporting whether a target node (namely RAN node 2) of the RAN interface setup request message supports the option 3/3a and/or option 4/4a and/or option 7/7a. Also, the RAN interface setup request message may include an enhanced eNB ID of the RAN node 1. The enhanced eNB ID of the RAN node 1 may be a global eNB ID of the RAN node 1. The RAN interface setup request message may be implemented by an existing message or a new message of the Xn interface or implemented by a new message of a new interface.

The RAN node 2, which has received the RAN interface setup request message, may take into account an indication indicating that the RAN node 1 supports the option 3/3a and/or an indication indicating that the RAN node 1 supports the option 4/4a and/or an indication indicating that the RAN node 1 supports the option 7/7a and/or an enhanced eNB ID (or global eNB ID) of the RAN node 1 for a UE-specific procedure. For example, for a dual connectivity procedure or multiple connectivity procedure, the RAN node 2 may use an indication indicating that the RAN node 1 supports the option 3/3a and/or an indication indicating that the RAN node 1 supports the option 4/4a and/or an indication indicating that the RAN node 1 supports the option 7/7a and/or an enhanced eNB ID (or global eNB ID) of the RAN node 1.

Also, at step S202, the RAN node 2 transmits an RAN interface setup response message to the RAN node 1. If the received RAN interface setup request message includes an indication requesting reporting whether the RAN node 2 supports the option 3/3a and/or option 4/4a and/or option 7/7a, the RAN interface setup response message may include an indication indicating that the RAN node 2 supports the option 3/3a and/or an indication indicating that the RAN node 2 supports the option 4/4a and/or an indication indicating that the RAN node 2 supports the option 7/7a. Also, the RAN interface setup response message may include a global gNB ID of the Xn interface. The RAN interface setup response message may be implemented by an existing message or a new message of the Xn interface or implemented by a new message of a new interface.

The RAN node 1, which has received an RAN interface setup response message, may perform a suitable operation based on the indication indicating that the RAN node 2 supports the option 3/3a and/or the indication indicating that the RAN node 2 supports the option 4/4a and/or the indication indicating that the RAN node 2 supports the option 7/7a and/or the global gNB ID of the RAN node 2. For example, based on the indication indicating that the RAN node 2 supports the option 3/3a and/or the indication indicating that the RAN node 2 supports the option 4/4a and/or the indication indicating that the RAN node 2 supports the option 7/7a and/or the global gNB ID of the RAN node 2, the RAN node 1 may trigger a new dual connectivity procedure distinguished from the legacy LTE dual connectivity procedure. Depending on the type of dual connectivity procedure, whether UE capability, flow-DRB mapping rule, etc., have to be included in the SeNB addition/modification message may be determined. Also, the RAN node 1 may determine the QoS type for a PDU session during the SeNB addition/modification procedure differently according to the type of the dual connectivity procedure.

Meanwhile, in the embodiment above, different message sets may be used for the option 3/3a, option 4/4a, and option 7/7a, respectively.

Figure 11:
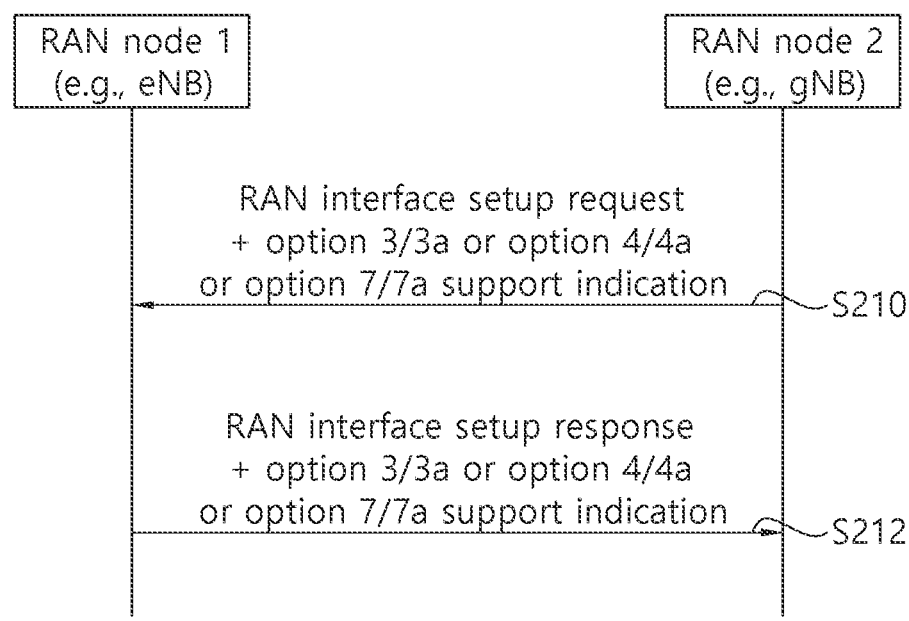
FIG. 11 illustrates an RAN interface setup procedure according to another embodiment of the present invention.

FIG. 11 illustrates an RAN interface setup procedure according to another embodiment of the present invention. In the present embodiment, it is assumed that RAN node 1 is eNB, and RAN node 2 is gNB. However, the assumption is only an example, and RAN node 1 and RAN node 2 may be one of eNB, gNB, ng-eNB, and en-gNB. Also, in the present embodiment, it is assumed that the RAN interface of the RAN node 1 and RAN node 2 is Xn interface. However, this assumption is also an example, and various other names may be used to refer to the RAN interface of the RAN node 1 and RAN node 2 (for example, Xn interface). In the present embodiment, the RAN node 2 triggers a procedure for setting up the RAN interface.

When the RAN interface between the RAN node 1 and RAN node 2 is setup, if the RAN node 2 supports the option 3/3a architecture and/or option 4/4a architecture and/or option 7/7a architecture for LTE/NR interworking, the RAN node 2 may want to know whether a target node also supports the option 3/3a architecture and/or option 4/4a architecture and/or option 7/7a architecture for LTE/NR interworking. This is so because depending on whether a target node supports the option 3/3a architecture and/or option 4/4a architecture and/or option 7/7a architecture for LTE/NR interworking, different messages may be used for triggering a dual connectivity procedure.

Accordingly, in step S210, the RAN node 2 transmits an RAN interface setup request message to the RAN node 1. The RAN interface setup request message may include an indication indicating that the RAN node 2 supports the option 3/3a. Also, the RAN interface setup request message may include an indication indicating that the RAN node 2 supports the option 4/4a. Also, the RAN interface setup request message may include an indication indicating that the RAN node 2 supports the option 7/7a. Also, the RAN interface setup request message may include an indication requesting reporting whether a target node (namely RAN node 1) of the RAN interface setup request message supports the option 3/3a and/or option 4/4a and/or option 7/7a. Also, the RAN interface setup request message may include a global gNB ID of the RAN node 2. The enhanced eNB ID of the RAN node 1 may be a global eNB ID of the RAN node 1. The RAN interface setup request message may be implemented by an existing message or a new message of the Xn interface or implemented by a new message of a new interface.

The RAN node 1, which has received the RAN interface setup request message, may take into account an indication indicating that the RAN node 2 supports the option 3/3a and/or an indication indicating that the RAN node 2 supports the option 4/4a and/or an indication indicating that the RAN node 2 supports the option 7/7a and/or a global gNB ID of the RAN node 2 for a UE-specific procedure. For example, for a dual connectivity procedure or multiple connectivity procedure, the RAN node 1 may use an indication indicating that the RAN node 2 supports the option 3/3a and/or an indication indicating that the RAN node 2 supports the option 4/4a and/or an indication indicating that the RAN node 2 supports the option 7/7a and/or a global gNB ID of the RAN node 2.

Also, at step S212, the RAN node 1 transmits an RAN interface setup response message to the RAN node 2. If the received RAN interface setup request message includes an indication requesting reporting whether the RAN node 1 supports the option 3/3a and/or option 4/4a and/or option 7/7a, the RAN interface setup response message may include an indication indicating that the RAN node 1 supports the option 3/3a and/or an indication indicating that the RAN node 1 supports the option 4/4a and/or an indication indicating that the RAN node 1 supports the option 7/7a. Also, the RAN interface setup response message may include an enhanced eNB ID of the RAN node 1. The eNB ID of the RAN node 1 may be a global eNB ID. The RAN interface setup response message may be implemented by an existing message or a new message of the Xn interface or implemented by a new message of a new interface.

The RAN node 2, which has received an RAN interface setup response message, may perform a suitable operation based on the indication indicating that the RAN node 1 supports the option 3/3a and/or the indication indicating that the RAN node 1 supports the option 4/4a and/or the indication indicating that the RAN node 1 supports the option 7/7a and/or the enhanced eNB ID (or global eNB ID) of the RAN node 1. For example, based on the indication indicating that the RAN node 1 supports the option 3/3a and/or the indication indicating that the RAN node 1 supports the option 4/4a and/or the indication indicating that the RAN node 1 supports the option 7/7a and/or the enhanced eNB ID (or global eNB ID) of the RAN node 1, the RAN node 2 may trigger a new dual connectivity procedure distinguished from the legacy LTE dual connectivity procedure. Depending on the type of dual connectivity procedure, whether UE capability, flow-DRB mapping rule, etc., have to be included in the SeNB addition/modification message may be determined. Also, the RAN node 2 may determine the QoS type for a PDU session during the SeNB addition/modification procedure differently according to the type of the dual connectivity procedure.

Meanwhile, in the embodiment above, different message sets may be used for the option 3/3a, option 4/4a, and option 7/7a, respectively.

According to an embodiment of the present invention, new architecture for a 5G core network including NR and 5G RAN may provide better services for UE in terms of throughput and UE experience. Also, tight interworking of LTE/NR may be performed more easily according to dual/multiple connectivity that may be triggered by the MN together with a suitable procedure. Also, dual/multiple connectivity capable of improving throughput of a UE according to the tight interworking of LTE/NR may be used, and signaling for UE mobility may be simplified.

Meanwhile, the present invention may be used to help RAN nodes trigger a mobility/handover procedure among various types of RAN nodes (namely eNB, gNB, ng-eNB, en-gNB).

Figure 12:
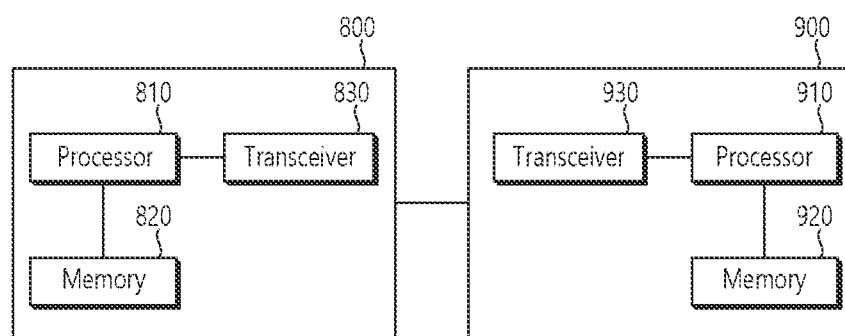
FIG. 12 shows a communication system to implement an embodiment of the present invention.

FIG. 12 shows a communication system to implement an embodiment of the present invention.

A first RAN node 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A second RAN node 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for performing a connection setup procedure by a second radio access network (RAN) node in a wireless communication system, the method comprising:
receiving, from a first RAN node, a connection setup request message including a global identifier (ID) of the first RAN node; and
transmitting, to the first RAN node, a connection setup response message including a global ID of the second RAN node,
wherein the connection setup procedure is initiated to exchange configuration data needed for the first RAN node and the second RAN node to inter-operate over a certain interface,
wherein the first RAN node is a RAN node which is one among either an eNodeB (eNB) or a gNB,
wherein the second RAN node is a RAN node which is the other among either the eNB or the gNB, and
wherein the global ID of the first RAN node and the global ID of the second RAN node are determined based on whether the first RAN node and the second RAN node are the eNB or the gNB respectively.

2. The method of claim 1, wherein the first RAN node is the eNB, and
wherein the second RAN node is the gNB.

3. The method of claim 2, wherein the global ID of the first RAN node includes a global eNB ID, and
wherein the global ID of the second RAN node includes a global gNB ID.

4. The method of claim 1, wherein the first RAN node is the gNB, and
wherein the second RAN node is the eNB.

5. The method of claim 4, wherein the global ID of the first RAN node includes a global gNB ID, and
wherein the global ID of the second RAN node includes a global eNB ID.

6. The method of claim 1, wherein the connection setup request message is an EN-DC X2 setup request message, and
wherein the connection setup response message is an EN-DC X2 setup response message.

7. The method of claim 1, further comprising triggering a dual connectivity procedure related to the EN-DC, based on the connection setup response message.

8. The method of claim 1,
wherein the connection setup procedure is an X2 setup procedure, and
wherein the certain interface is an X2 interface.

9. The method of claim 1,
wherein the connection setup procedure is an Xn setup procedure, and
wherein the certain interface is an Xn interface.

10. A second radio access network (RAN) node configured to operate in a wireless communication system, the second RAN node comprising:
a memory; and
a processor, operably coupled to the memory, and configured to:
control the second RAN node to receive, from a first RAN node, a connection setup request message including a global identifier (ID) of the first RAN node, and
control the second RAN node to transmit, to the second RAN node, a connection setup response message including a global ID of the second RAN node,
wherein a connection setup procedure is initiated to exchange configuration data needed for the first RAN node and the second RAN node to inter-operate over a certain interface,
wherein the first RAN node is a RAN node which is one among either an eNodeB (eNB) or a gNB,
wherein the second RAN node is a RAN node which is the other among either the eNB or the gNB, and
wherein the global ID of the first RAN node and the global ID of the second RAN node are determined based on whether the first RAN node and the second RAN node are the eNB or the gNB respectively.

11. The second RAN node of claim 10, wherein the first RAN node is the eNB, and
wherein the second RAN node is the gNB.

12. The second RAN node of claim 11, wherein the global ID of the first RAN node includes a global eNB ID, and
wherein the global ID of the second RAN node includes a global gNB ID.

13. The second RAN node of claim 10, wherein the first RAN node is the gNB, and
wherein the second RAN node is the eNB.

14. The second RAN node of claim 13, wherein the global ID of the first RAN node includes a global gNB ID, and
wherein the global ID of the second RAN node includes a global eNB ID.

15. The second RAN node of claim 10, wherein the connection setup request message is an EN-DC X2 setup request message, and
wherein the connection setup response message is an EN-DC X2 setup response message.

16. The second RAN node of claim 10, wherein the processor further triggers a dual connectivity procedure related to the EN-DC, based on the connection setup response message.

17. A non-transitory tangible computer-readable medium having stored thereon a plurality of instructions, which, when executed by a processor of a second radio access network (RAN) node, cause the second RAN node to:
receive, from a first RAN node, a connection setup request message including a global identifier (ID) of the first RAN node; and
transmit, to the first RAN node, a connection setup response message including a global ID of the second RAN node,
wherein a connection setup procedure is initiated to exchange configuration data needed for the first RAN node and the second RAN node to inter-operate over a certain interface,
wherein the first RAN node is a RAN node which is one among either an eNodeB (eNB) or a gNB,
wherein the second RAN node is a RAN node which is the other among either the eNB or the gNB, and
wherein the global ID of the first RAN node and the global ID of the second RAN node are determined based on whether the first RAN node and the second RAN node are the eNB or the gNB respectively.

18. The non-transitory tangible computer-readable medium of claim 17, wherein the first RAN node is the eNB, and
wherein the second RAN node is the gNB.

19. The non-transitory tangible computer-readable medium of claim 18, wherein the global ID of the first RAN node includes a global eNB ID, and
wherein the global ID of the second RAN node includes a global gNB ID.

20. The non-transitory tangible computer-readable medium of claim 17, wherein the first RAN node is the gNB, and
wherein the second RAN node is the eNB.

* * * * *